US010150359B2

(12) United States Patent
Tamura

(10) Patent No.: US 10,150,359 B2
(45) Date of Patent: Dec. 11, 2018

(54) LINK STRUCTURE BETWEEN IN-WHEEL MOTOR DRIVE DEVICE AND DAMPER, AND SUSPENSION DEVICE INCLUDING THE LINK STRUCTURE

(71) Applicant: NTN CORPORATION, Osaka (JP)

(72) Inventor: Shiro Tamura, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/120,800

(22) PCT Filed: Jan. 29, 2015

(86) PCT No.: PCT/JP2015/052487
§ 371 (c)(1),
(2) Date: Aug. 23, 2016

(87) PCT Pub. No.: WO2015/129379
PCT Pub. Date: Sep. 3, 2015

(65) Prior Publication Data
US 2016/0361989 A1 Dec. 15, 2016

(30) Foreign Application Priority Data
Feb. 27, 2014 (JP) ................. 2014-036241

(51) Int. Cl.
B60K 7/00 (2006.01)
B60G 3/20 (2006.01)
B60K 17/04 (2006.01)

(52) U.S. Cl.
CPC .............. B60K 7/0007 (2013.01); B60G 3/20 (2013.01); B60G 2200/144 (2013.01);
(Continued)

(58) Field of Classification Search
CPC ...................... B60K 7/0007; B60K 2007/0092
(Continued)

(56) References Cited

U.S. PATENT DOCUMENTS 5,087,229 A * 2/1992 Hewko ................ B60K 7/0007
180/65.51
5,127,485 A * 7/1992 Wakuta ................ B60K 7/0007
180/65.51
(Continued)

FOREIGN PATENT DOCUMENTS

CN 102717696 10/2012
JP 3-112724 5/1991
(Continued)

OTHER PUBLICATIONS

S. Murata, "Development of In-Wheel-Motor Drive Unit", Convention Proceedings No. 28-10, 2010.

Primary Examiner — Jeffrey J Restifo
(74) Attorney, Agent, or Firm — Clark & Brody

(57) ABSTRACT

In the link structure linking an in-wheel motor drive device (11) placed in a hollow area of a road wheel (W) of a turnable wheel to a damper (31), a damper bracket (32) extends in the vehicle traverse direction and at least a transversely outer end (321) of the damper (31) is placed in the hollow area of the road wheel (W). A first joint (18) is placed in the hollow area of the road wheel, and rotatably links the transversely outer end (321) of the damper bracket (32) to the in-wheel motor drive device (11). The damper (31) has a lower end (311) coupled to a transversely inner end (322) of the damper bracket (32).

6 Claims, 6 Drawing Sheets

(52) U.S. Cl.
 CPC .. *B60G 2204/129* (2013.01); *B60G 2204/182* (2013.01); *B60G 2300/50* (2013.01); *B60K 17/043* (2013.01); *B60K 2007/0038* (2013.01); *B60K 2007/0061* (2013.01); *B60K 2007/0092* (2013.01)

(58) Field of Classification Search
 USPC ..................................................... 180/65.51
 See application file for complete search history.

(56) References Cited

U.S. PATENT DOCUMENTS

| | | | | |
|---|---|---|---|---|
| 5,150,763 | A * | 9/1992 | Yamashita | B60K 7/0007 180/242 |
| 5,156,579 | A * | 10/1992 | Wakuta | H02K 9/19 180/65.51 |
| 5,163,528 | A * | 11/1992 | Kawamoto | B60K 7/0007 180/65.51 |
| 5,180,180 | A * | 1/1993 | Yamashita | B62D 9/00 180/253 |
| 5,415,427 | A * | 5/1995 | Sommerer | B60G 3/20 280/124.135 |
| 6,386,553 | B2 * | 5/2002 | Zetterstrom | B60G 3/20 180/413 |
| 7,118,119 | B2 * | 10/2006 | Amanuma | B60G 3/20 180/65.51 |
| 7,398,846 | B2 * | 7/2008 | Young | B60G 3/18 180/65.51 |
| 7,703,780 | B2 * | 4/2010 | Mizutani | B60G 3/20 280/124.1 |
| 7,735,588 | B2 * | 6/2010 | Murata | B60G 3/20 180/65.51 |
| 7,770,677 | B2 * | 8/2010 | Takenaka | B60G 3/14 180/65.51 |
| 7,789,178 | B2 * | 9/2010 | Mizutani | B60G 3/20 180/65.51 |
| 7,958,959 | B2 * | 6/2011 | Yogo | B60G 3/20 180/65.51 |
| 8,083,243 | B2 * | 12/2011 | Hamada | B60G 7/02 180/65.51 |
| 8,251,167 | B2 * | 8/2012 | Moriguchi | B60K 7/0007 180/65.51 |
| 8,342,612 | B2 * | 1/2013 | Sgherri | B60K 7/0007 180/65.51 |
| 2004/0080223 | A1 * | 4/2004 | Shimizu | B60K 7/0007 310/75 C |
| 2004/0099455 | A1 * | 5/2004 | Nagaya | B60G 3/20 180/65.51 |
| 2005/0056471 | A1 * | 3/2005 | Kurata | B60G 3/01 180/65.51 |
| 2005/0061565 | A1 * | 3/2005 | Mizutani | B60K 7/0007 180/65.51 |
| 2005/0257970 | A1 * | 11/2005 | Kakinami | B60K 7/00 180/65.51 |
| 2005/0257971 | A1 * | 11/2005 | Kakinami | B60K 7/00 180/65.51 |
| 2006/0144626 | A1 * | 7/2006 | Mizutani | B60K 7/0007 180/65.51 |
| 2007/0068715 | A1 * | 3/2007 | Mizutani | B60G 3/20 180/65.51 |
| 2008/0017462 | A1 * | 1/2008 | Mizutani | B60G 3/20 188/266.1 |
| 2008/0093133 | A1 * | 4/2008 | Yogo | B60G 3/20 180/55 |
| 2008/0283314 | A1 * | 11/2008 | Suzuki | B60G 7/008 180/65.51 |
| 2008/0289891 | A1 * | 11/2008 | Yogo | B60G 3/20 180/65.51 |
| 2009/0166111 | A1 * | 7/2009 | Mizutani | B60K 7/0007 180/65.51 |
| 2009/0218783 | A1 * | 9/2009 | Brandl | B60G 3/20 280/124.135 |
| 2009/0236158 | A1 * | 9/2009 | Sakuma | B60K 7/0007 180/65.51 |
| 2010/0000811 | A1 * | 1/2010 | Iwano | B60G 7/008 180/65.51 |
| 2011/0127094 | A1 * | 6/2011 | Hamada | B60G 7/02 180/65.51 |
| 2014/0353054 | A1 * | 12/2014 | Matayoshi | B60G 3/20 180/55 |
| 2015/0375613 | A1 * | 12/2015 | Koval | B60K 7/0007 180/242 |
| 2016/0052356 | A1 * | 2/2016 | Tamura | B60K 7/0007 180/65.51 |
| 2016/0052359 | A1 * | 2/2016 | Matayoshi | B60K 7/0007 180/65.51 |
| 2016/0221432 | A1 * | 8/2016 | Tamura | B60G 3/20 |
| 2016/0361989 | A1 * | 12/2016 | Tamura | B60G 3/20 |

FOREIGN PATENT DOCUMENTS

| | | |
|---|---|---|
| JP | 2005-178410 | 7/2005 |
| JP | 2005-329817 | 12/2005 |
| JP | 2009-202606 | 9/2009 |
| JP | 2010-116017 | 5/2010 |
| JP | 2010-214986 | 9/2010 |
| WO | 2013/073308 | 5/2013 |
| WO | 2014/178250 | 11/2014 |

* cited by examiner

LINK STRUCTURE BETWEEN IN-WHEEL MOTOR DRIVE DEVICE AND DAMPER, AND SUSPENSION DEVICE INCLUDING THE LINK STRUCTURE

TECHNICAL FIELD

The present invention relates to a suspension device for an in-wheel motor drive device that drives a turnable wheel.

BACKGROUND ART

In-wheel motor drive devices driven by electricity have the advantages of not only reducing the load on the environment, but also providing a larger interior space to automobiles in comparison with engine driven automobiles, because the in-wheel motor drive devices are placed inside wheels of the automobiles for driving the wheels. A conventional technique of attaching an in-wheel motor drive device to a vehicle body is shown in PTL 1, for example. The in-wheel motor drive device in PTL 1 has seating portions at its lower part to couple to a trailing arm of a suspension device.

On the other hand, a high-mounted double wishbone type suspension device as disclosed in PTL 2 has been known as a suspension device that suspends a turnable wheel regardless of the presence or absence of the in-wheel motor drive devices. The suspension device of PTL 2 includes an upper arm and a lower arm extending in the vehicle transverse direction, and a hydraulic damper having a lower end linked to the lower arm and an upper end linked to a vehicle body member.

In addition, a technique of suspending an in-wheel motor drive device by a high-mounted double wishbone type suspension device has been proposed to allow the in-wheel motor drive device to drive a turnable wheel (e.g., see NPL 1).

CITATION LIST

Patent Literature

PTL1: Japanese Unexamined Patent Application Publication No. 2010-116017
PTL2: Japanese Unexamined Patent Application Publication No. 2005-178410

Non Patent Literature

NPL 1: Satoshi Murata, "139-20105175 Development of in-wheel motor drive unit" in Convention Proceedings No. 28-10, published by Society of Automotive Engineers of Japan, Inc., in 2010

SUMMARY OF INVENTION

Problem to be Solved by the Invention

The suspension device, as shown in NPL 1, suspending an in-wheel motor drive device placed in a hollow area of a road wheel of a turnable wheel has the following problems. The hydraulic damper in NPL 1, when viewed from the front side in the vehicle longitudinal direction, extends vertically across the rotational axis of the wheel and the in-wheel motor drive device. In order to prevent a transversely inner end of the in-wheel motor drive device from interfering with the hydraulic damper, it is necessary to extremely increase the axial dimension of the road wheel of the turnable wheel to house the transversely inner end of the in-wheel motor drive device inside the hollow area of the road wheel. However, the dimension increase keeps the kingpin of the turnable wheel off from the axial center of the road wheel, resulting in a hindrance in turning the turnable wheel.

Alternatively, if the axial dimension of the road wheel in NPL 1 is shortened to be equal to the axial dimension of the road wheel of the turnable wheel in PTL 2, the transversely inner end of the in-wheel motor drive device interferes with the hydraulic damper.

In addition, the possibility of interference between the in-wheel motor drive device and hydraulic damper or between the road wheel and hydraulic damper may increase with an increase in turning angle because the in-wheel motor drive device is turned with the road wheel.

However, positional change of the hydraulic damper may hinder the turnable wheel including the in-wheel motor drive device from turning.

The present invention has been made in view of the aforementioned circumstances, and has an object to provide a link structure between an in-wheel motor drive device and a damper, which does not hinder the in-wheel motor drive device and the road wheel from turning, and avoids interference between the in-wheel motor drive device and hydraulic damper and interference between the road wheel and hydraulic damper.

Solution to Problem

For the object, the link structure between an in-wheel motor drive device and a damper according to the present invention includes an in-wheel motor drive device, at least a transversely outer end thereof being placed in a hollow area of a road wheel of a turnable wheel, a damper bracket extending in the vehicle transverse direction, at least a transversely outer end thereof being placed in the hollow area of the road wheel, a first joint placed in the hollow area of the road wheel and rotatably linking the transversely outer end of the damper bracket to the in-wheel motor drive device, and a damper having a lower end coupled to a transversely inner end of the damper bracket and an upper end attached to a vehicle body member and absorbing bound and rebound of the in-wheel motor drive device.

The present invention allows the first joint, which rotatably links the damper bracket to the in-wheel motor drive device, to be placed in the hollow area of the road wheel, and therefore the first joint can be placed in the vicinity of a kingpin passing through the hollow area of the road wheel of a turnable wheel. Such a first joint does not hinder the in-wheel motor drive device from turning.

In addition, the damper can be placed more inward than the road wheel in the vehicle transverse direction, thereby avoiding interference between the damper and road wheel regardless of the degree of the turning angle.

The first joint can be any joint that allows the in-wheel motor drive device to turn, such as a ball joint, and is not limited to a particular structure. The damper is also not limited to a particular structure, and can be, for example, a fluid pressure type cylinder, or a combination of a damping spring and a telescopic rod. The damper bracket also can be any damper bracket as long as it is extensible in the vehicle transverse direction. The damper bracket may be a part of the damper integrally formed at a lower end of the damper, or a separate component fixedly linked to the lower end of the damper with a bolt, a band or the like. If one axial end of the in-wheel motor drive device is fixedly linked to the turnable wheel, the other axial end of the in-wheel motor drive device may stick out from the hollow area of the road wheel.

The position at which the transversely outer end of the damper bracket is rotatably linked to the in-wheel motor drive device should be in the hollow area of the road wheel, but the detailed position is not particularly limited. In an embodiment of the present invention, the first joint is provided on an upper part of the in-wheel motor drive device. According to the embodiment, the damper can be placed above the in-wheel motor drive device. Therefore, interference between the damper and in-wheel motor drive device can be avoided regardless of the degree of the turning angle. Note that the upper part of the in-wheel motor drive device can be defined as a part above the axis of the in-wheel motor drive device, but it is not particularly limited in the fore-and-aft direction. The first joint in a preferred embodiment is placed almost immediately above the axis of the in-wheel motor drive device or its vicinity.

In an embodiment of the present invention, the first joint is placed in the hollow area of the road wheel so as to align with the kingpin passing through an upper area and a lower area of the hollow area of the road wheel. Since the first joint according to the embodiment is aligned with the kingpin, a turning force applied to the turnable wheel is not input to the damper bracket. Therefore, the damper is not affected by the turning force regardless of the degree of the turning angle, but the in-wheel motor drive device can be easily turned. In another embodiment, the first joint may not be aligned with the kingpin, but may be placed in the vicinity of the kingpin. Note that the kingpin denotes an axis on which the turnable wheel turns, and is indicated by a phantom straight line; however, the kingpin can be an actual component, such as a pin, placed away from the first joint.

In an embodiment of the present invention, the in-wheel motor drive device has a vertical arm that extends upwardly therefrom. The vertical arm has a root part positioned in the hollow area of the road wheel and an upper end positioned above the hollow area of the road wheel. The upper end of the vertical arm is rotatably linked to a vehicle body member, and makes up an upper end of the kingpin. According to the embodiment, it is possible to place the vehicle body member, which supports the in-wheel motor drive device in a turnable manner on the upper side, or, for example, a vertically swingable link member of the suspension device, away from the turnable wheel, thereby providing greater design freedom and improving the ride quality associated with the suspension device. In another embodiment in which a low-mounted double wishbone type suspension device is used, the in-wheel motor drive device may be rotatably linked at its upper part to, for example, a free end of an upper arm, instead of the vertical arm, in the hollow area of the road wheel.

It should be understood that the suspension device for suspending the in-wheel motor drive device in the turnable wheel is not particularly limited, and the shape, number, and position of the link member for linking the in-wheel motor drive device to the vehicle body are also not limited. The suspension device for the turnable wheel to which the link structure of the present invention is applied is not particularly limited; however, the suspension device suspending the in-wheel motor drive device in a preferred embodiment includes a damper bracket extending in a vehicle transverse direction, at least a transversely outer end thereof being placed in a hollow area of a road wheel and rotatably linked to the in-wheel motor drive device, a damper having a lower end coupled to a transversely inner end of the damper bracket and an upper end attached to a vehicle body member, and absorbing bound and rebound of the in-wheel motor drive device, and a link member extending in the vehicle transverse direction and having a transversely inner end serving as a base end linked to a vehicle body member and a transversely outer end serving as a free end swingable up and down, the free end being rotatably linked to the in-wheel motor drive device and included in a kingpin passing through an upper area and a lower area of the hollow area of the road wheel.

According to the present invention, the damper bracket is rotatably linked to the in-wheel motor drive device in the hollow area of the road wheel of the turnable wheel in which the vertically-extending kingpin passes through the hollow area of the road wheel, and therefore the position at which the damper bracket is linked to the in-wheel motor drive device can be placed in the vicinity of the kingpin, and this placement does not hinder the in-wheel motor drive device from turning.

Since the lower end of the damper is linked to the in-wheel motor drive device with the damper bracket extending in the vehicle transverse direction, the damper can be placed more inward than the road wheel in the vehicle transverse direction. Therefore, interference between the damper and road wheel can be avoided regardless of the degree of the turning angle.

The component for linking in a rotatable manner can be anything as long as it allows the in-wheel motor drive device to turn, such as a ball joint, and is not limited to a particular structure. The damper is also not limited to a particular structure, and can be, for example, a fluid pressure type cylinder, or a combination of a damping spring and a telescopic rod. The damper bracket also can be any damper bracket as long as it is extensible in the vehicle transverse direction. The damper bracket may be a part of the damper integrally formed at a lower end of the damper, or a separate component fixedly linked to the lower end of the damper with a bolt, a band or the like. If an axial end of the in-wheel motor drive device is fixedly linked to the turnable wheel, the other axial end of the in-wheel motor drive device may stick out from the hollow area of the road wheel.

The link member of the suspension device in a preferred embodiment includes an upper arm linking an upper part of the in-wheel motor drive device to a vehicle body member and a lower arm placed below the upper arm and linking a lower part of the in-wheel motor drive device to a vehicle body member. According to the embodiment, the link structure of this invention can be applied to a double wishbone type suspension device. Note that the lower part of the in-wheel motor drive device can be defined as a part below the axis of the in-wheel motor drive device, but it is not particularly limited in the fore-and-aft direction. The free end of the lower arm in a preferred embodiment is linked to the in-wheel motor drive device almost immediately above the axis of the in-wheel motor drive device or its vicinity.

Advantageous Effects of Invention

According to the present invention, the first joint, which rotatably links the turnable in-wheel motor drive device to the lower end of the non-turnable damper, is aligned with or is close to the kingpin, and therefore does not hinder the in-wheel motor drive device from turning. Therefore, interference between the in-wheel motor drive device and damper can be avoided regardless of the degree of the turning angle of the in-wheel motor drive device. The present invention can preferably achieve the link structure between the in-wheel motor drive device and the damper of the suspension device in order to place the in-wheel motor drive device in the turnable wheel.

DESCRIPTION OF EMBODIMENT

Figure 1:
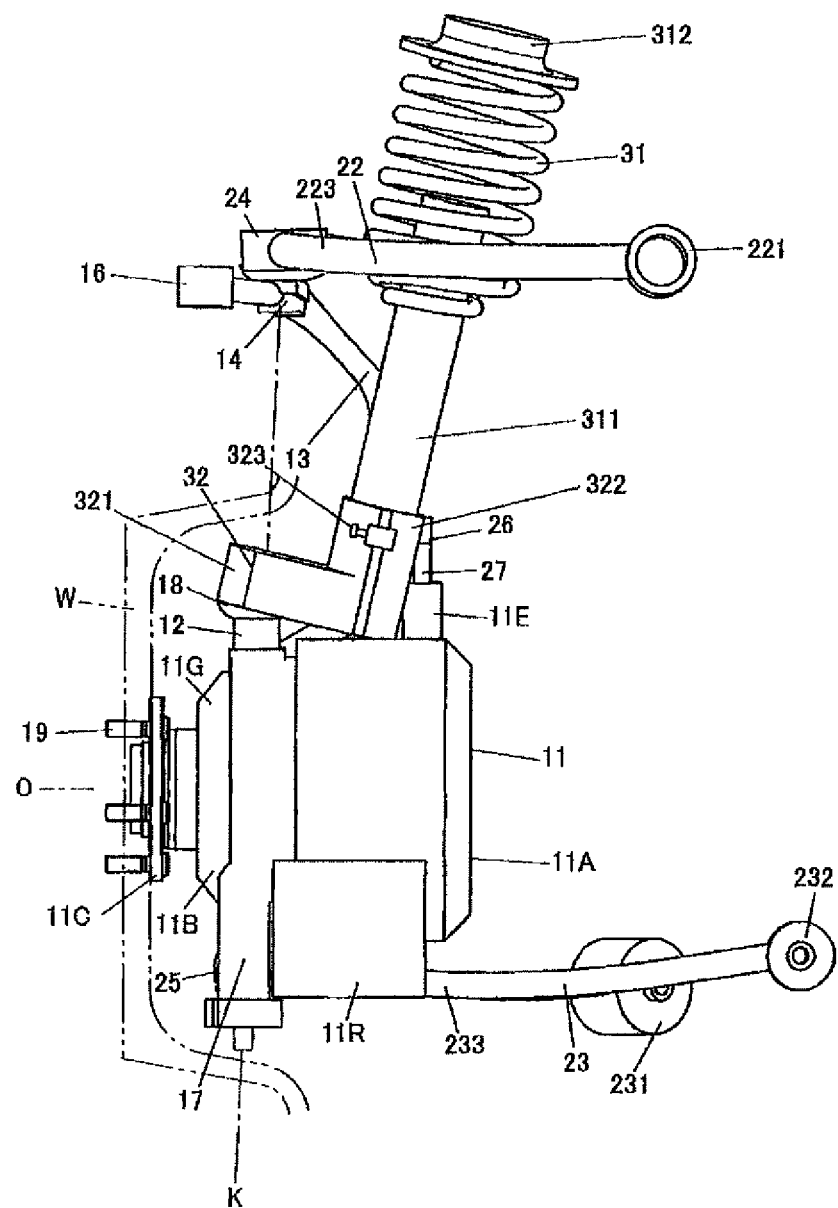
FIG. 1 is a front view of a suspension device including a link structure between an in-wheel motor drive device and a damper, according to an embodiment of the present invention.
Figure 2:
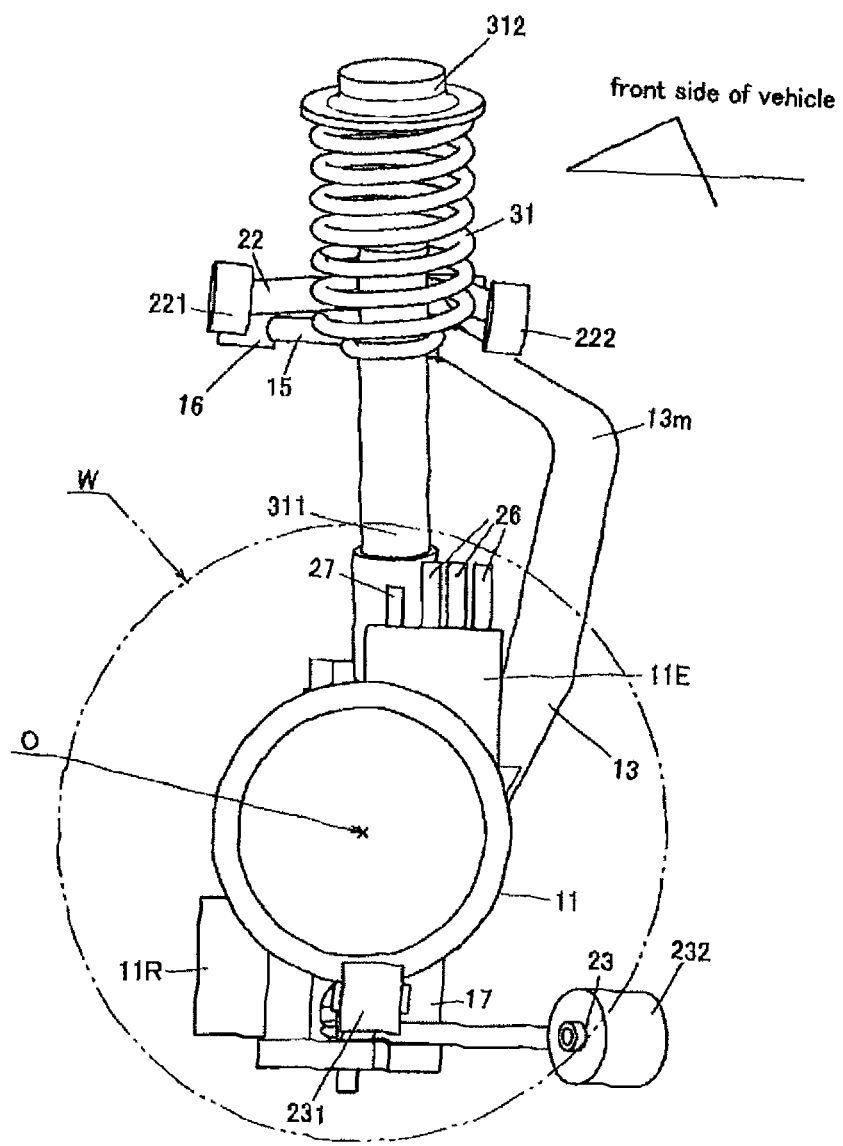
FIG. 2 is a side view of the suspension device.
Figure 3:
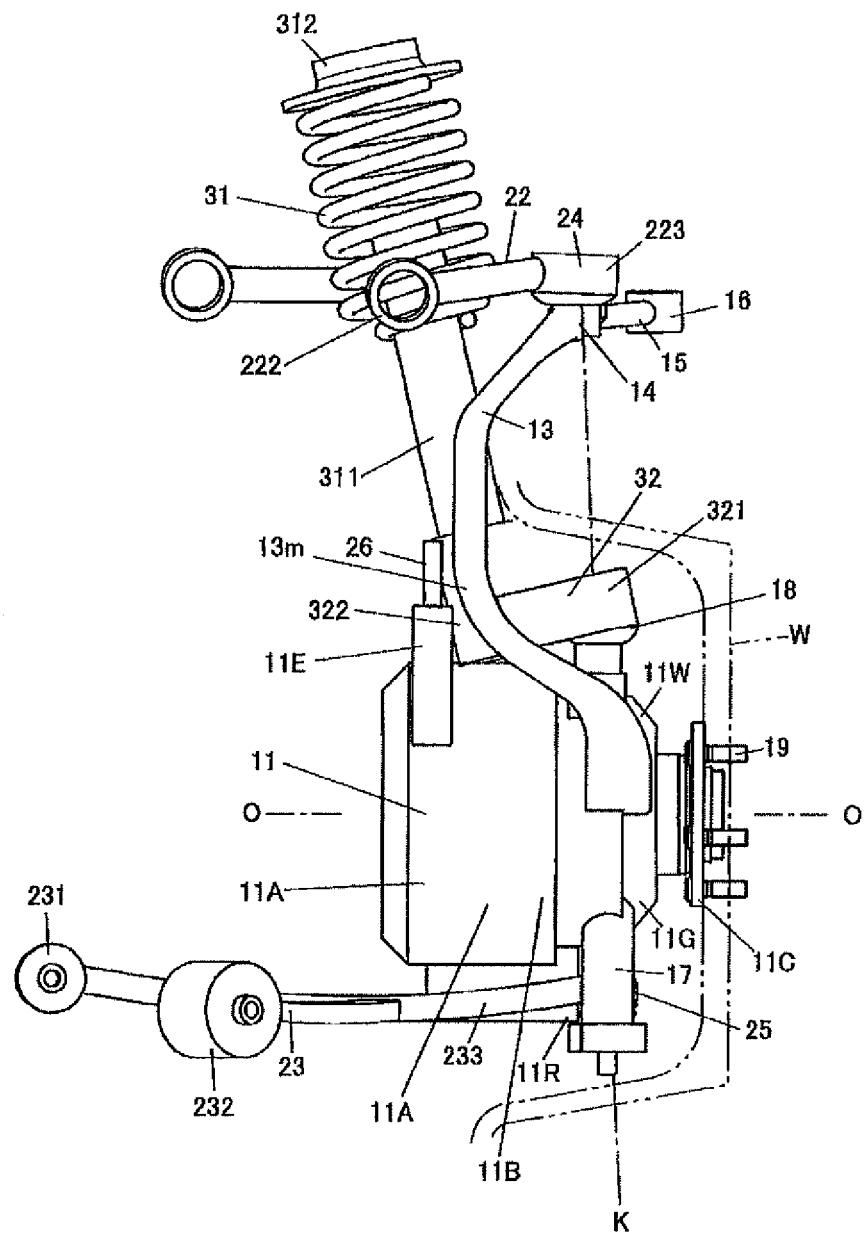
FIG. 3 is a back view of the suspension device.
Figure 4:
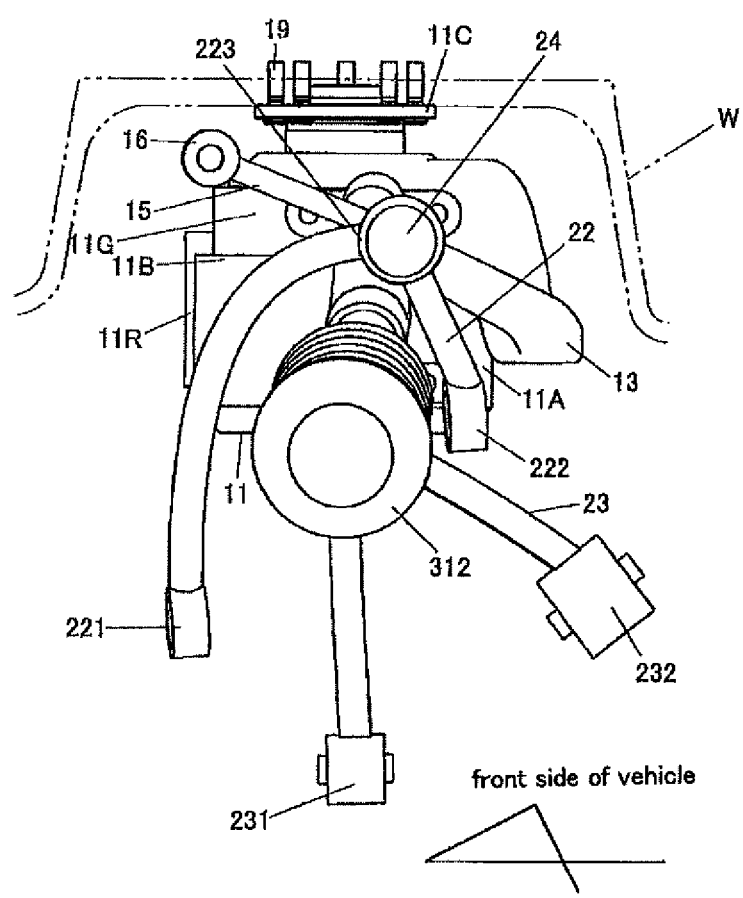
FIG. 4 is a plan view of the suspension device.
Figure 5:
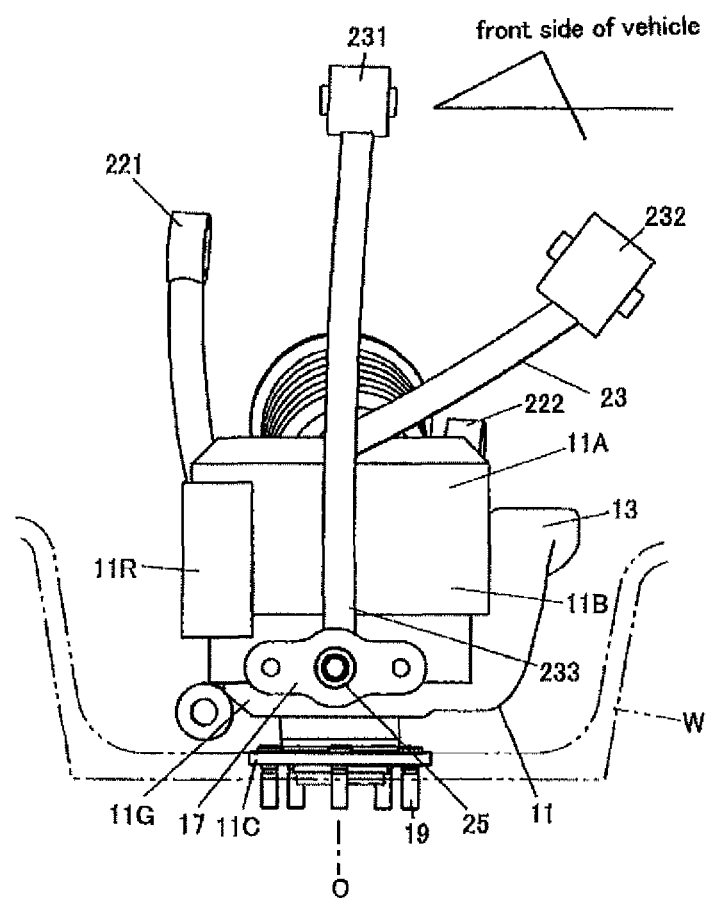
FIG. 5 is a bottom view of the suspension device.
Figure 6:
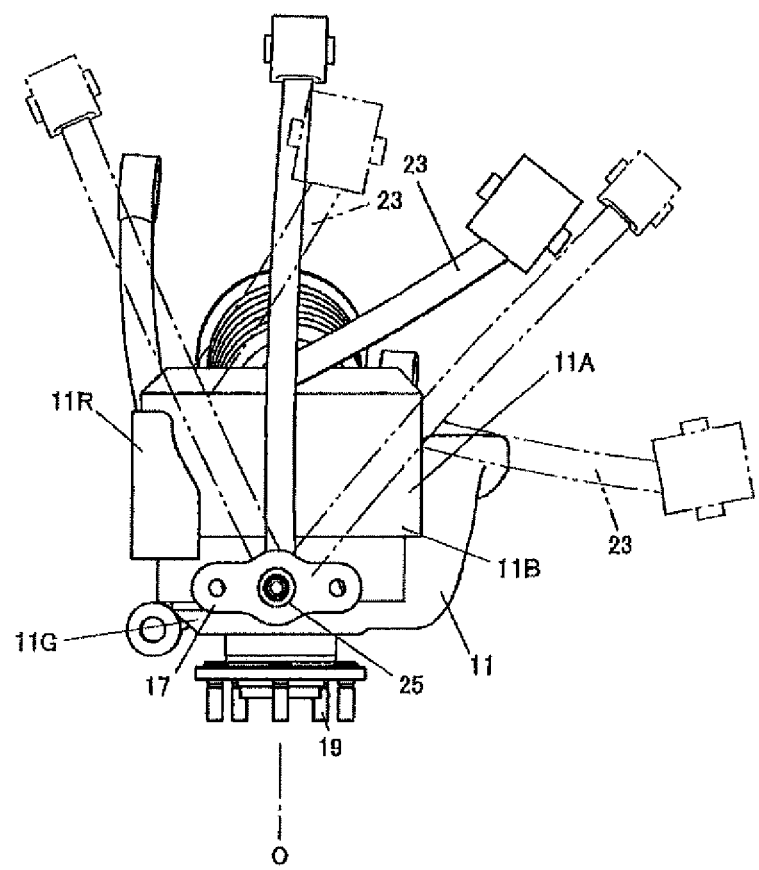
FIG. 6 is a bottom view showing the maximum turning angles of the suspension device.

With reference to the accompanying drawings, an embodiment of the present invention will be described below. FIG. 1 is a front view showing a link structure between an in-wheel motor drive device and a damper according to an embodiment of the present invention, as observed from the front side of a vehicle. The link structure of the embodiment is adopted into a suspension device that suspends the in-wheel motor drive device as shown in FIG. 1. FIG. 2 is a side view of the suspension device, as observed from the inside in the vehicle transverse direction. FIG. 3 is a back view of the suspension device, as observed from the rear side of the vehicle. FIG. 4 is a plan view of the suspension device, as observed from above the vehicle. FIG. 5 is a bottom view of the suspension device, as observed from below the vehicle. FIG. 6 is a bottom view showing the maximum turning angles of the suspension device in the right and left directions.

First of all, this description will begin with an in-wheel motor drive device 11. The in-wheel motor drive device 11 includes a motor unit 11A, a speed reducing unit 11B, and a hub unit 11C, which are coaxially arranged in line in order. When the turning angle of a turnable wheel is 0°, the axis O of the in-wheel motor drive device 11 extends in the vehicle transverse direction as shown in FIG. 1. The motor unit 11A is housed in a relatively large diameter casing located on the inside in the vehicle transverse direction, while the speed reducing unit 11B is housed in a relatively small diameter casing located on the outside in the vehicle transverse direction. These casings are a non-rotational member forming the contour of the units, while the hub unit 11C is a rotational member projecting from the speed reducing unit 11B outwardly in the vehicle transverse direction and is used to fixedly link a road wheel W, indicated by phantom lines, of a turnable wheel with a plurality of bolts 19.

The motor unit 11A includes a rotating armature in the casing to drive the hub unit 11C or to regenerate electric power by utilizing rotations of the hub unit 11C. The speed reducing unit 11B includes a speed reducing mechanism, such as a cycloid reducer, in the casing to reduce the rotational speed of the motor unit 11A and transmit it to the hub unit 11C. In a lower part of the motor unit 11A and speed reducing unit 11B, there is an oil tank 11R jutting radially outward over the casings of the motor unit 11A and speed reducing unit 11B to trap and store oil.

The hub unit 11C and speed reducing unit 11B, which are located on the relatively outside in the vehicle transverse direction, are placed in a hollow area of a cylindrical-shaped road wheel W. On the other hand, the motor unit 11A, which is located on the relatively inside in the vehicle transverse direction, partially sticks out of the hollow area of the road wheel W inwardly in the vehicle transverse direction. A third ball joint seating portion 17 is provided on a lower part of the speed reducing unit 11B. A first ball joint seating portion 12 is provided on an upper part of the speed reducing unit 11B so as to project upwardly. In this embodiment, the third ball joint seating portion 17 is located almost immediately below the axis O, while the first ball joint seating portion 12 is located almost immediately above the axis O.

On an upper part of the speed reducing unit 11B, formed is a vertical arm 13 extending upwardly along an arc on the rear side of the first ball joint seating portion 12. Specifically speaking, the vertical arm 13 is integrally coupled at its root part to a casing 11G of the in-wheel motor drive device 11, extends from the root part to its midsection 13m inwardly in the vehicle transverse direction, and then extends from the midsection 13m to its upper end outwardly in the vehicle transverse direction, to avoid interference with the road wheel W (FIG. 3). The upper end of the vertical arm 13 is provided with a second ball joint seating portion 14. As described above, the vertical arm 13 extends vertically from the hollow area of the road wheel W to cross over the road wheel W. The upper end of the vertical arm 13 including the second ball joint seating portion 14 is situated above the road wheel W.

The vertical arm 13 also extends backward from the root part to the midsection 13m and then extends forward from the midsection 13m to the upper end (FIG. 2).

In addition, a fore-and-aft extending arm 15 extends forward from the second ball joint seating portion 14 at the upper end of the vertical arm 13 (see FIG. 4). The fore-and-aft extending arm 15 has a front end 16 linked to a tie rod of a steering device (not shown).

Next, a description will be made about a suspension device that suspends the in-wheel motor drive device 11.

The suspension device shown in FIGS. 1 to 6 is a double wishbone type suspension device including an upper arm 22 linked to an upper part of the in-wheel motor drive device 11, a lower arm 23 linked to a lower part of the in-wheel motor drive device 11, and a damper 31 that damps the amounts of bound and rebound of the in-wheel motor drive device 11. There is no problem to use well-known components as the upper arm 22, lower arm 23, and damper 31.

The upper arm 22 is roughly shaped like a letter V as shown in FIG. 4, and the V-shaped upper arm 22 has transversely inner ends 221, 222 at its opposite ends serving as base ends that are swingably linked to a vehicle body member, such as a body frame (not shown). The upper arm 22 also has a transversely outer end 223 at its center, serving as a free end that is rotatably linked to the second ball joint seating portion 14 located on the upper end of the vertical arm 13 via a second ball joint 24. It is found that this suspension device is a high-mounted double wishbone type suspension device from the facts that the second ball joint 24 is situated above the road wheel W (see FIG. 1), and the upper arm 22 is positioned vertically higher than an upper arm of a low-mounted double wishbone type suspension device. It should be understood that the vehicle body member is any of the components belonging to the vehicle body from the explanations of the components.

The lower arm 23 includes, as shown in FIG. 5, a front arm extending in the vehicle transverse direction, and a rear arm branched off from some midpoint of the front arm and extending backward and diagonally inward in the vehicle transverse direction. The rear arm has a front-side transversely inner end 231 and a rear-side transversely inner end 232 serving as base ends that are swingably linked to a vehicle body member, such as a body frame (not shown). The lower arm 23 also has a transversely outer end 233 serving as a free end that is rotatably linked to the third ball joint seating portion 17 on the lower part of the in-wheel motor drive device 11.

As described above, the transversely outer end 233 of the lower arm 23, the third ball joint 25, the third ball joint seating portion 17 provided at the lower part of the in-wheel motor drive device 11 are placed in the hollow area of the road wheel W. Although it is not shown in the drawings, the upper arm 22 and lower arm 23 can of course have other shapes than the aforementioned V-shape and branching shape.

The second ball joint 24 on the upper side and the third ball joint 25 on the lower side allow the in-wheel motor drive device 11 to turn. A phantom line extending through the second ball joint 24 and third ball joint 25 represents a kingpin K. The turnable wheel including the in-wheel motor drive device 11 and the road wheel W can turn rightward and leftward about the kingpin K. FIG. 6 shows the positional relationship between the lower arm 23 and in-wheel motor drive device 11 when the turnable wheel turns leftward and rightward to the maximum turning angles. This embodiment is applied to, for example, the front wheels on the right and left of a vehicle.

A description will be made about the link structure between the in-wheel motor drive device 11 and the damper 31.

The first ball joint seating portion 12 provided on the casing of the in-wheel motor drive device 11 is rotatably linked to a transversely outer end 321 of the damper bracket 32 through a first ball joint 18. The first ball joint 18 prevents the damper bracket 32 from turning with a turn of the in-wheel motor drive device 11. The damper bracket 32 extends in the vehicle transverse direction, and at least the transversely outer end 321 of the damper bracket 32 is placed in the hollow area of the road wheel W (FIGS. 1 and 3). The transversely inner end 322 of the damper bracket 32 is shaped like a vertically-extending cylindrical sleeve, and a lower end 311 of the damper 31 is inserted into the cylindrical sleeve and secured. Securing the inserted damper bracket is made by tightening a bolt 323 attached on an outer circumference of the cylindrical sleeve to compress the diameter of the cylindrical sleeve.

The damper 31 extending vertically has a lower end 311 coupled to the transversely inner end 322 of the damper bracket 32 and an upper end 312 attached to a vehicle body member, such as a top part of a wheel housing (not shown). When the upper arm 22 and lower arm 23 swing up and down, and the in-wheel motor drive device 11 bounds and rebounds with respect to the vehicle body, the damper 31 extends and contracts to damp the bound and rebound of the in-wheel motor drive device 11.

In addition, a terminal box 11E is mounted on an upper part of the motor unit 11A, and three power cables 26 and a signal cable 27 extend upwardly from the terminal box 11E. The terminal box 11E is positioned about the same as the damper bracket 32 in the vertical direction, but the damper bracket 32 is positioned more outward than the terminal box 11E in the vehicle transverse direction (see FIG. 3). The first ball joint 18 is placed in the hollow area of the road wheel W so as to align with the kingpin K passing through an upper area and lower area of the hollow area of the road wheel W. Therefore, neither of the damper bracket 32 and damper 31 turns even if the in-wheel motor drive device 11 turns. Accordingly, more preferable turning of the turnable wheel and the in-wheel motor drive device can be achieved.

According to this embodiment, the link structure includes the in-wheel motor drive device 11 having at least a transversely outer end placed in the hollow area of the road wheel W of the turnable wheel, the damper bracket 32 extending in the vehicle transverse direction and having at least a transversely outer end placed in the hollow area of the road wheel W, the first ball joint 18 placed in the hollow area of the road wheel W and rotatably linking the transversely outer end 321 of the damper bracket 32 to the in-wheel motor drive device 11, and the damper 31 having the lower end 311 coupled to the transversely inner end 322 of the damper bracket 32 and the upper end 312 attached to a vehicle body member and absorbing bound and rebound of the in-wheel motor drive device 11.

According to the link structure between the in-wheel motor drive device 11 and the damper 31, the first ball joint 18, which rotatably links the damper bracket 32 to the in-wheel motor drive device 11, is placed in the hollow area of the road wheel W, as shown in FIGS. 1 and 3, and consequently can be placed in the vicinity of the kingpin K, and therefore the first ball joint 18 does not hinder the in-wheel motor drive device 11 from turning.

Since the damper 31 can be placed more inward than the road wheel W in the vehicle transverse direction, interference between the damper 31 and the road wheel W can be avoided regardless of the degree of the turning angle.

In addition, according to the embodiment, the first ball joint 18 is placed on an upper part of the in-wheel motor drive device 11. This placement allows the lower end 311 of the damper 31 to be linked to the upper part of the in-wheel motor drive device 11 through the damper bracket 32, which extends in the vehicle transverse direction, thereby placing the damper 31 above the in-wheel motor drive device 11. Therefore, interference between the damper 31 and in-wheel motor drive device 11 can be avoided regardless of the degree of the turning angle.

According to this embodiment, the first ball joint 18 is placed in the hollow area of the road wheel W so as to align with the kingpin K passing through an upper area and lower area of the hollow area of the road wheel W, and therefore turning force is not input from the turnable wheel to the damper bracket 32. Thus, the turning force does not affect the damper 31 regardless of the degree of the turning angle, but easily turns the in-wheel motor drive device 11.

According to this embodiment, the in-wheel motor drive device 11 includes the vertical arm 13 that extends upwardly from the contour of the in-wheel motor drive device 11, and has a root part positioned in the hollow area of the road wheel W and an upper end positioned above the hollow area of the road wheel W. The upper end of the vertical arm 13 is rotatably linked to the upper arm 22 through the second ball joint 24 and makes up an upper end of the kingpin K. This can achieve a layout in which the upper arm 22, which supports the in-wheel motor drive device 11 in a turnable manner on the upper side of the in-wheel motor drive device 11, is placed away from the turnable wheel. This layout provides greater design freedom to the upper arm 22 to improve the ride quality associated with the suspension device.

The suspension device, shown in FIGS. 1 to 6, includes the damper bracket 32, damper 31, upper arm 22, and lower arm 23 to suspend the in-wheel motor drive device 11. The damper bracket 32 extends in the vehicle transverse direction and has at least the transversely outer end 321 that is placed in the hollow area of the road wheel W and is rotatably linked to the in-wheel motor drive device 11. The damper 31 has the lower end 311 coupled to the transversely inner end 322 of the damper bracket 32 and the upper end 312 attached to a vehicle body member, to absorb the bound and rebound of the in-wheel motor drive device 11. The upper arm 22 and lower arm 23 extend in the vehicle transverse direction and have the transversely inner ends serving as base ends linked to a vehicle body member and the transversely outer ends serving as free ends swingable up and down. The free ends are rotatably linked to the in-wheel motor drive device 11 and are included in the kingpin K passing through an upper area and lower area of the hollow area of the road wheel W. This configuration allows the first ball joint 18, which rotatably links the damper bracket 32 to the in-wheel motor drive device 11, to be placed in the vicinity of the kingpin K, thereby preferably achieving turning of the turnable wheel including the in-wheel motor drive device 11 and road wheel W.

In addition, the suspension device shown in FIGS. 1 to 6 includes, as a vertically swingable link structure having a base end and free end, the upper arm 22 that links an upper part of the in-wheel motor drive device 11 to a vehicle body member, and the lower arm 23 that is placed below the upper arm 22 and links a lower part of the in-wheel motor drive device 11 to the vehicle body member. This configuration allows a double wishbone type suspension device to suspend the in-wheel motor drive device 11 in a turnable manner.

The motor to be employed as the motor unit 11A may be an interior magnet synchronous motor (i.e., IPM motor). Alternatively, the motor may be a radial gap motor or an axial gap motor.

Furthermore, the in-wheel motor drive assembly 11 according to the present invention includes a cycloid reducer as an example; however, the present invention is not limited thereto and can adopt other types of reducer, such as a planetary speed reducer and a parallel double-shaft speed reducer, or it can adopt a so-called direct type motor without a speed reducer.

The foregoing has described the embodiment of the present invention by referring to the drawings. However, the invention should not be limited to the illustrated embodiment. It should be appreciated that various modifications and changes can be made to the illustrated embodiment within the scope of the appended claims and their equivalents.

INDUSTRIAL APPLICABILITY

The link structure between the in-wheel motor drive device and damper according to the present invention is advantageously used in electric vehicles and hybrid vehicles.

REFERENCE SIGNS LIST

11 in-wheel motor drive device
12 first ball joint seating portion
13 vertical arm
14 second ball joint seating portion
17 third ball joint seating portion
18 first ball joint
22 upper arm
23 lower arm
24 second ball joint
25 third ball joint
31 damper
32 damper bracket
K kingpin
O axis of in-wheel motor drive device
W road wheel

The invention claimed is:

1. A link structure between an in-wheel motor drive device and a damper comprising:
    an in-wheel motor drive device, at least a transversely outer end thereof being placed in a hollow area of a road wheel of a turnable wheel;
    a damper bracket extending transversely in a vehicle width direction, the damper bracket having a transversely inner end and a transversely outer end, at least the transversely outer end thereof being placed in the hollow area of the road wheel;
    a telescoping damper having a lower end and an upper end, the lower end coupled to the transversely inner end of the damper bracket and the upper end attached to a vehicle body member, the telescoping damper absorbing bound and rebound of the in-wheel motor drive device; and
    a first joint placed in the hollow area of the road wheel, the first joint rotatably linking the transversely outer end of the damper bracket to the in-wheel motor drive device.

2. The link structure between the in-wheel motor drive device and the damper according to claim 1, wherein
    the first joint is provided on an upper part of the in-wheel motor drive device.

3. The link structure between the in-wheel motor drive device and the damper according to claim 1, wherein
    the first joint is placed in the hollow area of the road wheel so as to align with a kingpin passing through an upper area and a lower area of the hollow area of the road wheel.

4. The link structure between the in-wheel motor drive device and the damper according to claim 3, wherein
    the in-wheel motor drive device has a vertical arm extending upwardly therefrom, the vertical arm having a root part positioned in the hollow area of the road wheel and an upper end positioned above the hollow area of the road wheel, and
    the upper end of the vertical arm is rotatably linked to a vehicle body member and makes up an upper end of the kingpin.

5. A suspension device suspending an in-wheel motor drive device comprising:
    a damper bracket extending in a vehicle transverse direction, at least a transversely outer end thereof being placed in a hollow area of a road wheel and rotatably linked to the in-wheel motor drive device;
    a damper having a lower end coupled to a transversely inner end of the damper bracket and an upper end attached to a vehicle body member, and absorbing bound and rebound of the in-wheel motor drive device; and
    a link member extending in the vehicle transverse direction and having a transversely inner end serving as a base end linked to a vehicle body member and a transversely outer end serving as a free end swingable up and down, the free end being rotatably linked to the in-wheel motor drive device and included in a kingpin passing through an upper area and a lower area of the hollow area of the road wheel.

6. The suspension device according to claim 5, wherein
    the link member includes an upper arm linking an upper part of the in-wheel motor drive device to a vehicle body member and a lower arm placed below the upper arm and linking a lower part of the in-wheel motor drive device to a vehicle body member.

\* \* \* \* \*